US010819203B2

(12) United States Patent
Muraguchi et al.

(10) Patent No.: US 10,819,203 B2
(45) Date of Patent: Oct. 27, 2020

(54) LINEAR ACTUATOR

(71) Applicant: SINFONIA TECHNOLOGY CO., LTD., Tokyo (JP)

(72) Inventors: Yosuke Muraguchi, Tokyo (JP); Hiroshi Takizawa, Tokyo (JP); Yasuhiro Sakai, Tokyo (JP); Takayoshi Fujii, Tokyo (JP); Takashi Fukunaga, Tokyo (JP)

(73) Assignee: SINFONIA TECHNOLOGY CO., LTD., Minato-Ku, Tokyo (JP)

( * ) Notice: Subject to any disclaimer, the term of this patent is extended or adjusted under 35 U.S.C. 154(b) by 99 days.

(21) Appl. No.: 16/311,071

(22) PCT Filed: May 2, 2017

(86) PCT No.: PCT/JP2017/017290
§ 371 (c)(1),
(2) Date: Dec. 18, 2018

(87) PCT Pub. No.: WO2017/221557
PCT Pub. Date: Dec. 28, 2017

(65) Prior Publication Data
US 2019/0181737 A1    Jun. 13, 2019

(30) Foreign Application Priority Data
Jun. 23, 2016  (JP) .................................. 2016-124993

(51) Int. Cl.
*H02K 33/06*  (2006.01)
*H02K 33/16*  (2006.01)
(Continued)

(52) U.S. Cl.
CPC ............... *H02K 33/06* (2013.01); *H02K 3/46* (2013.01); *H02K 33/16* (2013.01); *H02K 41/035* (2013.01); *H02K 2203/12* (2013.01)

(58) Field of Classification Search
CPC .................................................. H02K 2203/12
See application file for complete search history.

(56) References Cited

U.S. PATENT DOCUMENTS

| 9,647,524 B2 * | 5/2017 | Nakagawa | ............. H02K 33/16 |
| 2005/0001491 A1 * | 1/2005 | Fujiwara | ................ H02K 33/02 |
| | | | 310/12.31 |

(Continued)

FOREIGN PATENT DOCUMENTS

| EP | 2348621 A1 | 7/2011 |
| EP | 2432102 A1 | 3/2012 |

(Continued)

OTHER PUBLICATIONS

Extended European Search Report issued in corresponding European Patent Application No. 17 81 5028, dated Apr. 26, 2019 (8 pages).

(Continued)

*Primary Examiner* — John K Kim
*Assistant Examiner* — Minki Chang
(74) *Attorney, Agent, or Firm* — Buchanan Ingersoll & Rooney PC

(57) ABSTRACT

A linear actuator is provided that has a configuration capable of inhibiting contact between an inner core and a plate spring that is connected to the inner core and an outer core, and which is realized by a configuration that is easy to assemble. A stator is arranged in an opening section of a through-hole in the inner core, and has a spacer through which a shaft passes. An outer frame section of the plate spring is connected to the outer core, and a fixed section of the plate spring is connected to the inner core through the spacer in a state in which the shaft passes therethrough. The spacer includes a penetration section having an insertion hole which the shaft is inserted through, and restriction sections (Continued)

and which restrict a displacement of a predetermined amount or more of the plate spring to the inner core side.

10 Claims, 11 Drawing Sheets

(51) Int. Cl.
*H02K 41/035* (2006.01)
*H02K 3/46* (2006.01)

(56) References Cited

U.S. PATENT DOCUMENTS

| | | | |
|---|---|---|---|
| 2011/0198945 A1* | 8/2011 | Nakagawa | H02K 33/16 310/12.25 |
| 2012/0062047 A1* | 3/2012 | Nakagawa | H02K 9/19 310/17 |
| 2014/0091645 A1 | 4/2014 | Nakagawa et al. | |

FOREIGN PATENT DOCUMENTS

| JP | 2010-233298 A | 10/2010 |
|---|---|---|
| JP | 2012-217257 A | 11/2012 |
| JP | 2012-249425 A | 12/2012 |
| JP | 2012-249426 | 12/2012 |
| JP | 2012-249426 A | 12/2012 |
| JP | 2013-179750 A | 9/2013 |

OTHER PUBLICATIONS

Notification Concerning Transmittal of International Preliminary Report on Patentability (PCT/IB/326) dated Jan. 3, 2019, by the International Bureau of WIPO for International Application No. PCT/JP2017/017290. (7 pages).
Notification of Transmittal of Translation of International Preliminary Report on Patentability (PCT/IB/338) dated Jan. 3, 2019, by the International Bureau of WIPO for International Application No. PCT/JP2017/017290. (7 pages)
International Search Report (PCT/ISA/210) dated Jul. 18, 2017, by the European Patent Office as the International Searching Authority for International Application No. PCT/JP2017/017290.
Written Opinion (PCT/ISA/237) dated Jul. 18, 2017, by the European Patent Office as the International Searching Authority for International Application No. PCT/JP2017/017290.
Notice of Reasons for Refusal issued in corresponding Japanese Patent Application No. 2016-124993, dated Mar. 17, 2020, with English Translation (6 pages).
Decision to Grant a Patent issues in corresponding Japanese Patent Application No. 2016-124993, dated Jul. 14, 2020, with English Translation (5 pages).

* cited by examiner

LINEAR ACTUATOR

TECHNICAL FIELD

The present invention relates to a linear actuator including a stator, a movable element, and a plate spring that connects the movable element and the stator in a manner such that the movable element is capable of performing a reciprocating movement with respect to the stator.

BACKGROUND ART

Linear actuators are already known in which a movable element and a stator are connected by a plate spring in a manner that enables a reciprocating movement therebetween. As such kind of linear actuators, for example, Patent Literatures 1 and 2 disclose configurations in which a stator has an inner core, permanent magnets arranged on the outer side of the inner core, and a coil that is wound around the inner core, and in which an outer core that is a component of a movable element is arranged so as to surround the inner core.

In the aforementioned configurations, the outer core is arranged facing the permanent magnets so as to have a predetermined interval therebetween. Further, in the aforementioned configurations, the inner core and the outer core are connected by a plate spring in a manner such that the outer core is capable of performing a reciprocating movement with respect to the inner core in one direction. The plate spring is connected to the inner core and the outer core in a manner such that the aforementioned one direction matches the thickness direction, and allows a reciprocating movement of the outer core with respect to the inner core in the one direction by deformation in the thickness direction.

In the aforementioned configurations, the outer core can be caused to perform a reciprocating movement with respect to the inner core in the one direction by controlling the passage of current to the coil to thereby alter a magnetic field that arises between the outer core and the permanent magnets.

CITATION LIST

Patent Literature

Patent Literature 1: Japanese Patent Laid-Open No. 2010-233298
Patent Literature 2: Japanese Patent Laid-Open No. 2012-249426

SUMMARY OF INVENTION

Technical Problem

In this connection, in the configurations disclosed in the aforementioned Patent Literatures 1 and 2, if a large displacement is applied to the outer core or the inner core, the plate spring connecting the outer core and the inner core deforms by a large amount in the thickness direction. When the plate spring deforms by a large amount in the thickness direction, there is a possibility that the plate spring will contact the inner core. In such a case, there is a possibility that a metallic sound will be generated by contact between the plate spring and the inner core.

With respect to the aforementioned problem, in order to prevent contact between the plate spring and the inner core, it is conceivable for a restriction member which restricts contact between the plate spring and the inner core to be provided between the plate spring and the inner core. However, if the aforementioned restriction member is provided, the number of components will increase and the complexity of the assembly work will increase. Consequently, the production cost of the linear actuator will increase.

An object of the present invention is, with respect to a linear actuator, to realize a configuration that is capable of inhibiting contact between an inner core and a plate spring that is connected to the inner core and an outer core, by means of a configuration that is easy to assemble.

Solution to Problem

A linear actuator according to one embodiment of the present invention includes a stator, a movable element, and a plate spring that connects the movable element and the stator in a manner such that the movable element is capable of performing a reciprocating movement with respect to the stator. The stator includes: an inner core having a through-hole extending in one direction; a permanent magnet arranged at least at one end among two ends in an orthogonal direction to the one direction in the inner core; a coil that is wound around the inner core at a predetermined position in the orthogonal direction; a shaft that is inserted through the through-hole of the inner core; and a spacer that is arranged in an opening section of the through-hole in the inner core, and through which the shaft passes. The movable element has an outer core that is arranged outside of the stator so as to cover the permanent magnet. An outer circumferential portion of the plate spring is connected to the outer core, and a central portion of the plate spring is connected to the inner core through the spacer in a state in which the shaft passes therethrough. The spacer has a penetration section having an insertion hole that the shaft is inserted through, and a restriction section that restricts a deformation of a predetermined amount or more of the plate spring to the inner core side.

Advantageous Effects of Invention

According to a linear actuator of one embodiment of the present invention, a spacer arranged between a plate spring and an opening section of a through-hole in an inner core of a stator has a penetration section which a shaft is inserted through, and a restriction section that restricts displacement of the plate spring to the inner core side.

Thereby, even in a case where a large force is applied to the inner core or outer core and a deformation to the inner core side occurs in the plate spring, the plate spring can be prevented from contacting the inner core by the restriction section. Furthermore, because the restriction section is provided in the spacer, assembly work with respect to the linear actuator is facilitated.

Accordingly, the linear actuator that is capable of restricting contact between the inner core and the plate spring which is connected to the inner core and the outer core can be realized by means of a configuration that is easy to assemble.

DESCRIPTION OF EMBODIMENTS

Figure 1:
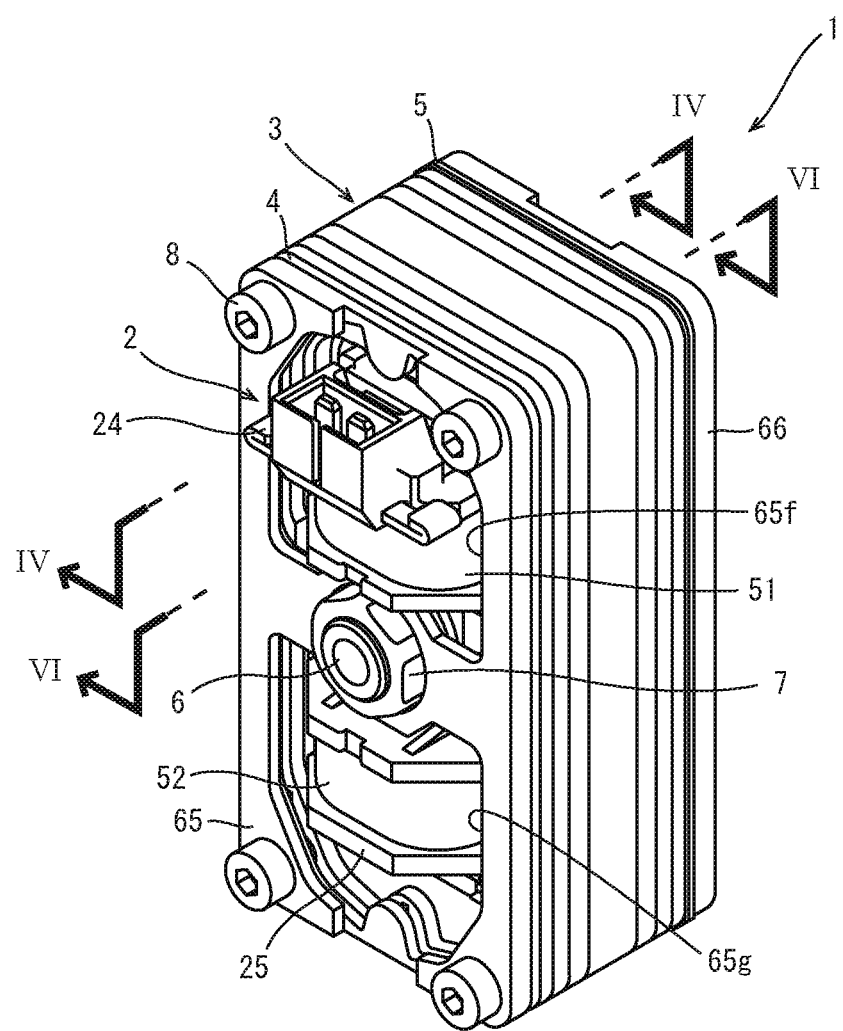
FIG. 1 is a perspective view illustrating the overall configuration of a linear actuator according to one embodiment of the present invention.

A linear actuator according to one embodiment of the present invention includes a stator, a movable element, and a plate spring that connects the movable element and the stator in a manner such that the movable element is capable of performing a reciprocating movement with respect to the stator. The stator includes: an inner core having a through-hole that extends in one direction; a permanent magnet arranged at least at one end among two ends in an orthogonal direction to the one direction in the inner core; a coil that is wound around the inner core at a predetermined position in the orthogonal direction; a shaft that is inserted through the through-hole of the inner core; and a spacer that is arranged in an opening section of the through-hole in the inner core, and through which the shaft passes. The movable element has an outer core that is arranged outside of the stator so as to cover the permanent magnet. An outer circumferential portion of the plate spring is connected to the outer core, and a central portion of the plate spring is connected to the inner core through the spacer in a state in which the shaft passes therethrough. The spacer has a penetration section having an insertion hole that the shaft is inserted through, and a restriction section which restricts a deformation of a predetermined amount or more of the plate spring to the inner core side (first configuration).

In the above described configuration, the spacer that is arranged between the inner core of the stator and the plate spring that is connected to the stator and the movable element also has, in addition to the penetration section that the shaft passes through, a restriction section that restricts a displacement of a predetermined amount or more of the plate spring to the inner core side.

Thereby, a displacement of a predetermined amount or more of the plate spring to the inner core side can be restricted by the restriction section so that the plate spring does not contact the inner core. Furthermore, because the restriction section is provided in the spacer, it is not necessary to provide a separate member that restricts a displacement of the plate spring to the inner core side. Hence, an increase in the number of components when assembling the linear actuator can be prevented, and an increase in the cost of producing the linear actuator can be suppressed.

Therefore, according to the above described configuration, a configuration which is capable of inhibiting contact between an inner core and a plate spring that is connected to the inner core and an outer core can be realized by a configuration that is easy to assemble.

In the first configuration, a recess that is capable of housing the spacer is formed in the opening section in the inner core (second configuration). Thereby, when a spacer is arranged in the opening section of the through-hole of the inner core, the spacer can be inhibited from protruding by a large amount in one direction of the linear actuator with respect to the inner core. Hence, the linear actuator can be formed with a compact structure in the one direction. Further, because the spacer can be easily positioned with respect to the inner core, the workability when assembling the linear actuator can be improved.

In the first or second configuration, a bobbin is further provided that covers the inner core, and around which the coil is wound. A bobbin opening section through which the shaft is inserted and which exposes the spacer is formed in the bobbin. In the penetration section of the spacer, a protrusion section is provided which, as seen from the one direction, extends outward at a different position from the restriction section. On the inner core side of the bobbin opening section, a housing recess that is capable of housing the protrusion section of the spacer is formed (third configuration).

Thereby, the protrusion section can be sandwiched between the bobbin and the inner core in a state in which the protrusion section of the spacer is housed inside the housing recess which is formed on the inner core side of the bobbin opening section of the bobbin covering the inner core and around which the coil is wound. Hence, the spacer can be held between the bobbin and the inner core.

Furthermore, by providing the housing recess that is capable of housing the protrusion section of the spacer in the bobbin opening section, the spacer can be easily positioned with respect to the bobbin. Thereby, the workability when assembling the linear actuator can be improved.

Further, because the spacer is exposed from the bobbin opening section, contact of the plate spring against the restriction section of the spacer is possible. Thereby, impairment of the function of the restriction section can be prevented.

In the third configuration, a pair of the protrusion sections is provided so that, when the penetration section is viewed from the one direction, the pair of protrusion sections sandwich the penetration section. A pair of the housing recesses is provided at facing positions on the inner core side in the bobbin opening section when the inner core side of the bobbin opening section is viewed from the one direction, so as to be capable of housing the pair of protrusion sections (fourth configuration).

Thereby, the pair of protrusion sections provided in the penetration section of the spacer can be housed inside the housing recesses provided on the inner core side of the bobbin opening section. Hence, the spacer can be more securely held between the bobbin and the inner core. Further, because the spacer can be arranged more accurately with respect to the bobbin, the workability when assembling the linear actuator can be improved.

In any one configuration among the first to fourth configurations, the plate spring has a connection section that connects the central portion to one part of the outer circumferential portion in a manner that enables a relative displacement in the thickness direction between the outer circumferential portion and the central portion. The restriction section restricts a displacement of the predetermined amount or more of the outer circumferential portion (fifth configuration).

Thereby, when the outer circumferential portion undergoes a relative displacement with respect to the central portion due to elastic deformation of the connection section of the plate spring, the displacement of the outer circumferential portion can be restricted by the restriction section. Hence, when the plate spring deforms to the inner core side, contact by the plate spring against a peripheral portion of the through-hole of the inner core can be more securely prevented.

Hereunder, an embodiment of the present invention is described in detail referring to the accompanying drawings. The same or equivalent parts in the drawings are denoted by the same reference numerals and a description of such parts is not repeated.

(Overall Configuration)

FIG. 1 is a perspective view illustrating the schematic configuration of a linear actuator 1 according to an embodiment of the present invention. The linear actuator 1 includes a stator 2 and a movable element 3, and is an apparatus that causes the movable element 3 to perform a reciprocating movement with respect to the stator 2. The linear actuator 1, for example, is used in a vehicle or the like as an apparatus that reduces vibrations.

The linear actuator 1 is formed in a rectangular parallelepiped shape overall. Specifically, the linear actuator 1 includes the stator 2, the movable element 3, plate springs 4 and 5, a shaft 6, a nut 7 and bolts 8. The stator 2 is arranged on the inner side of the movable element 3 that is formed in a rectangular cylinder shape. The stator 2 and the movable element 3 are connected by the plate springs 4 and 5 in a manner so that the movable element 3 is capable of performing a reciprocating movement in one direction (cylindrical axis direction of the movable element 3) with respect to the stator 2.

Hereunder, the configuration of the linear actuator 1 is described in detail using FIG. 2 to FIG. 7.

Figure 2:
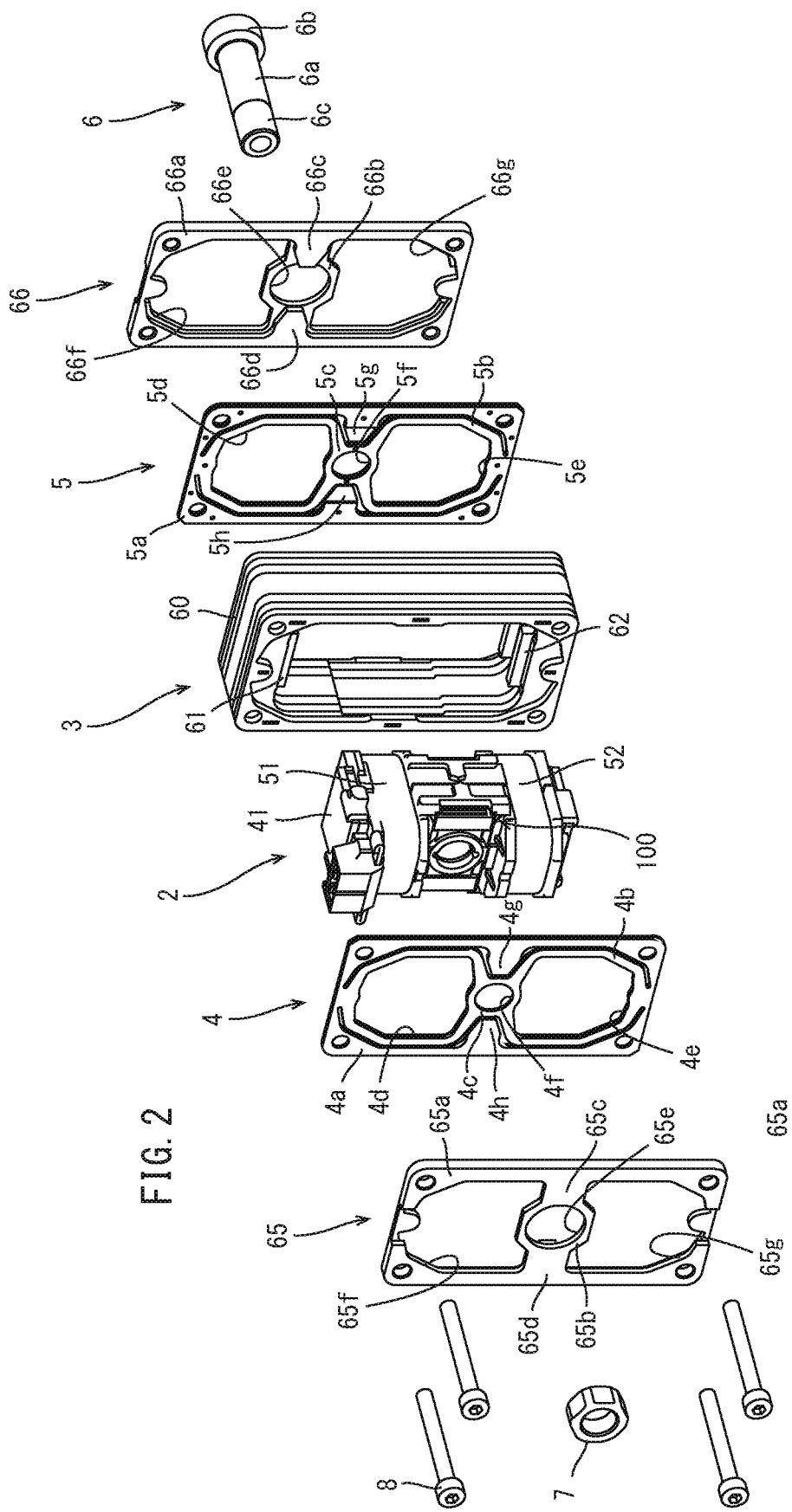
FIG. 2 is an exploded perspective view of the linear actuator.
Figure 3:
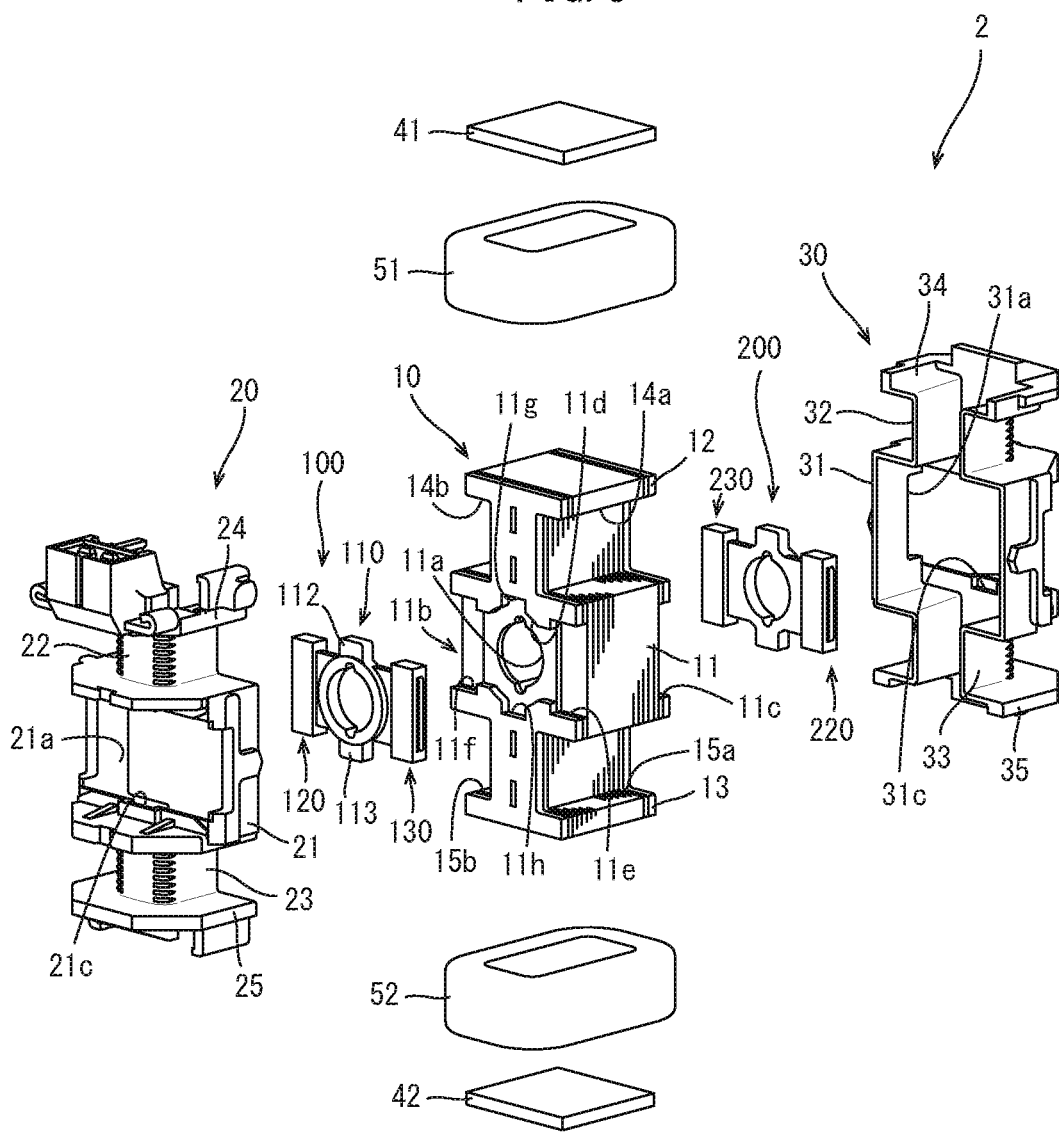
FIG. 3 is an exploded perspective view of a stator.

As shown in FIG. 2, the stator 2 is formed in a rectangular parallelepiped shape overall. As shown in FIG. 3, the stator 2 includes an inner core 10, bobbins 20 and 30, permanent magnets 41 and 42, coils 51 and 52, and spacers 100 and 200.

The inner core 10 is constructed in a columnar shape by integrating (crimping) a plurality of electromagnetic steel plates in a stacked state. In the inner core 10, a center section 11 whose dimension in the width direction (orthogonal direction to the stacking direction and longitudinal direction; the crosswise direction in FIG. 3) is greater than at other portions as viewed from one direction (the stacking direction; page surface direction with respect to FIG. 3) is formed at a central portion in the longitudinal direction, and flange sections 12 and 13 which protrude to both sides in the width direction are formed at both ends in the longitudinal direction.

Thereby, in the inner core 10, groove sections 14a and 14b that extend in the aforementioned one direction are formed between the center section 11 and the flange section 12. Further, in the inner core 10, groove sections 15a and 15b that extend in the one direction are formed between the center section 11 and the flange section 13. Note that, the groove sections 14a and 15a are formed on one side in the width direction of the inner core 10, and the groove sections 14b and 15b are formed on the other side in the width direction of the inner core 10.

Figure 4:
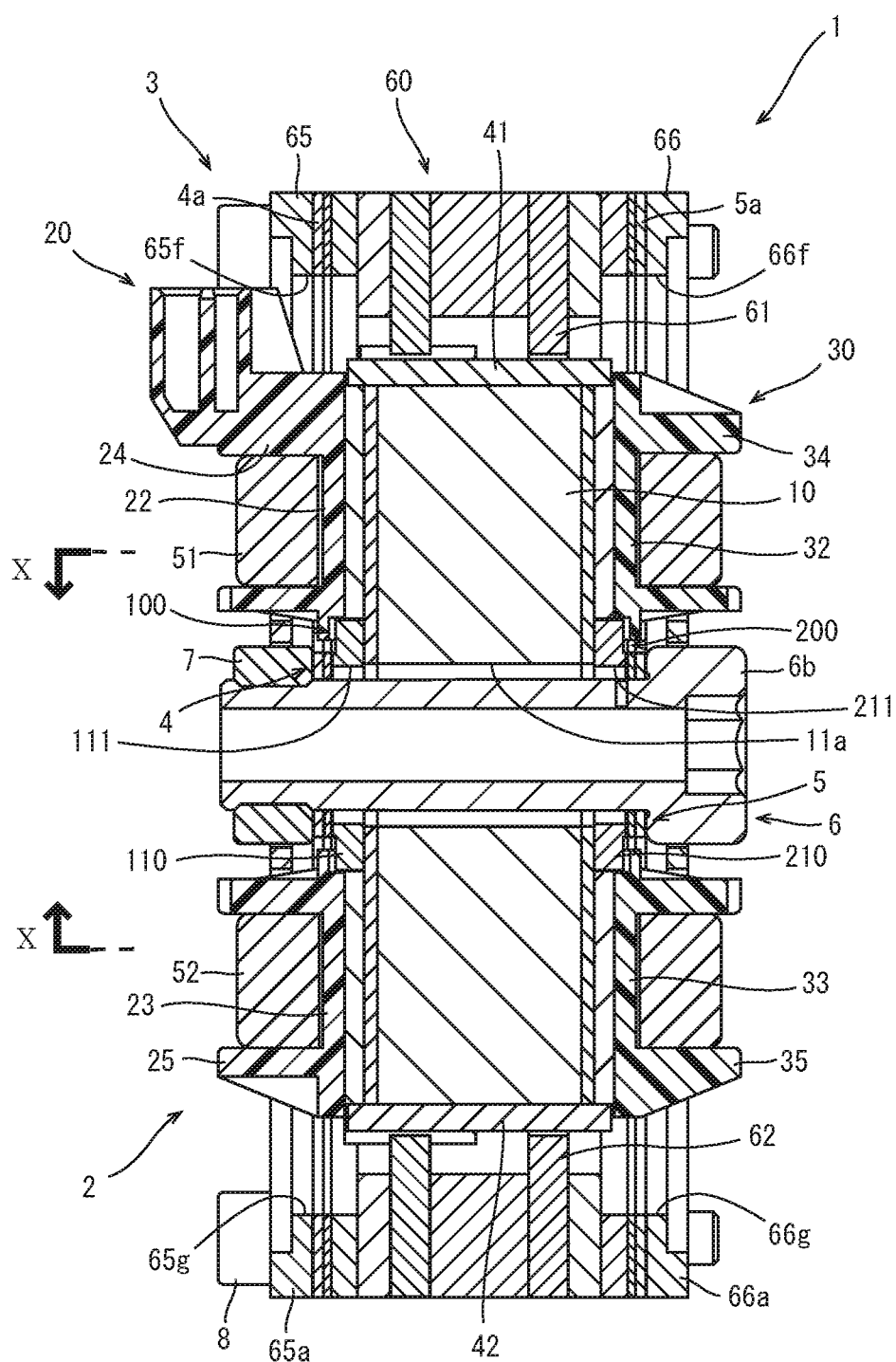
FIG. 4 is a cross-sectional view along a line IV-IV in FIG. 1.

A through-hole 11a that extends in the one direction is formed in the center section 11 of the inner core 10. As shown in FIG. 4, the shaft 6 is fixed inside the through-hole 11a in a state in which the shaft 6 has been inserted as far as a predetermined position. Thereby, the inner core 10 and the shaft 6 are integrated in a state in which the shaft 6 passes through the inner core 10.

As shown in FIG. 3, recesses 11b and 11c for housing the spacers 100 and 200, respectively, are formed at two ends in the aforementioned one direction of the center section 11 of the inner core 10. The recesses 11b and 11c have the same configuration as each other, and hence only the recess 11b will be described hereinafter.

The recess 11b includes a first recess 11d that is formed in an opening section of the through-hole 11a, and second recesses 11e and 11f which are formed on both sides in the width direction relative to the first recess 11d and which have a greater depth (dimension in the aforementioned one direction) than the first recess 11d.

A penetration section 110, described later, of the spacer 100 is positioned inside the first recess 11d. Restriction sections 120 and 130, described later, of the spacer 100 are positioned inside the second recesses 11e and 11f, respectively.

Further, at positions which are at a central portion in the width direction with respect to the first recess 11d and are at two ends in the longitudinal direction, the recess 11b has third recesses 11g and 11h that are connected to the first recess 11d, so as to be capable of housing protrusion sections 112 and 113, described later, which extend outward from the penetration section 110 of the spacer 100.

By providing the recesses 11b and 11c for housing the spacers 100 and 200, respectively, at two ends in the one direction in the center section 11 of the inner core 10 in this manner, the spacers 100 and 200 can be compactly arranged in the one direction with respect to the inner core 10. Thereby, the linear actuator 1 can be compactly constructed in the one direction. Furthermore, because the spacers 100 and 200 can be easily positioned with respect to the inner core 10, the workability when assembling the stator 2 can be improved.

As shown in FIG. 4, the permanent magnets 41 and 42 are arranged at ends in the longitudinal direction of the inner core 10, respectively.

The permanent magnets 41 and 42 are configured so that magnetic poles having different polarities to each other are alternately arranged in the one direction. Further, the permanent magnets 41 and 42 are arranged so that portions facing each other across the inner core 10 in the one direction are magnetic poles that have different polarities to each other.

Figure 6:
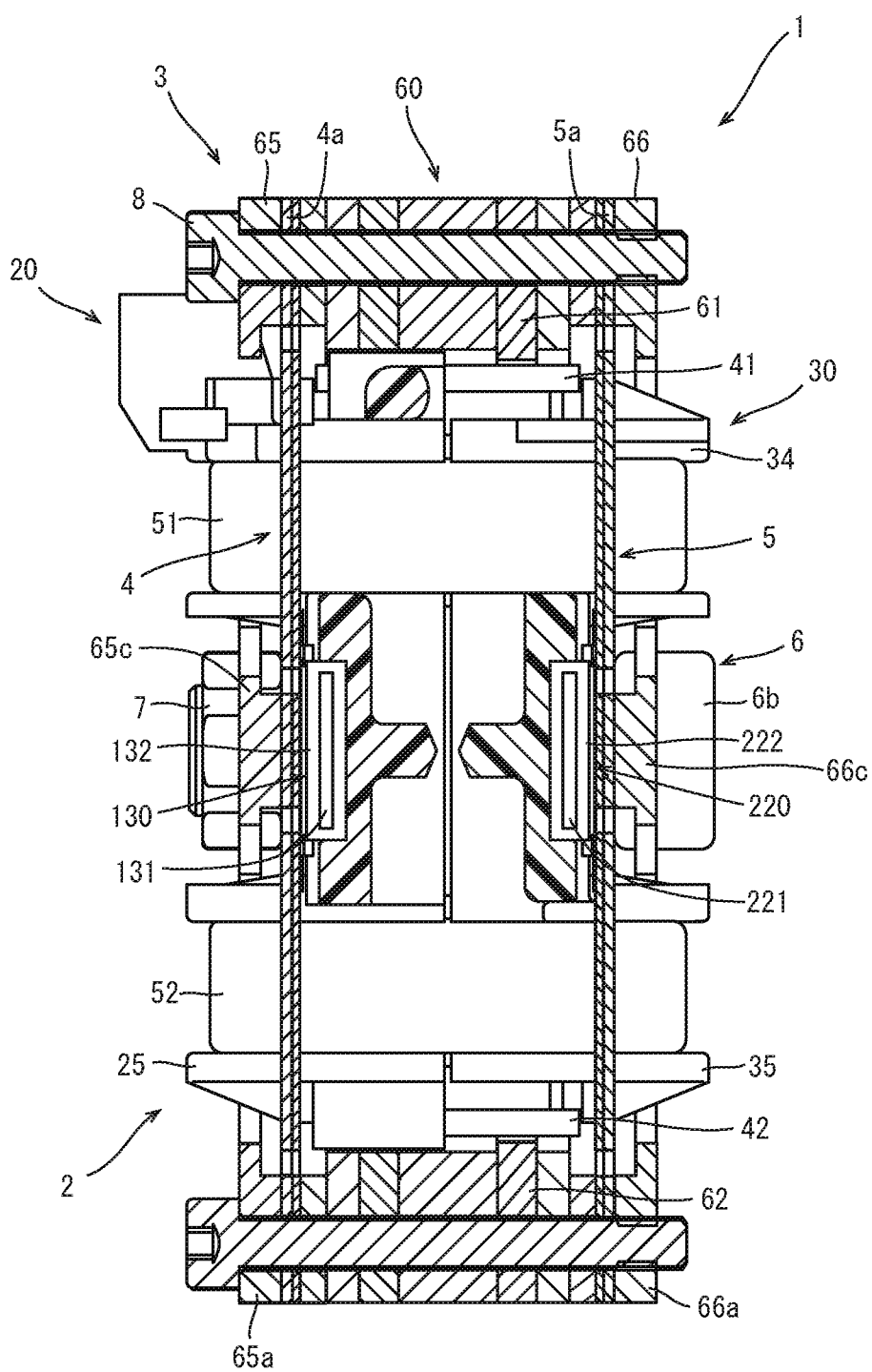
FIG. 6 is a cross-sectional view along a line VI-VI in FIG. 1.

The bobbins 20 and 30 are each a member that is made of resin, and as shown in FIG. 3 and FIG. 6, are each formed so as to cover one-half of the inner core 10 in the one direction. The bobbins 20 and 30 cover the inner core 10 by being arranged so as to sandwich the inner core 10 in the one direction.

Specifically, as shown in FIG. 3, the bobbin 20 has a center cover section 21, groove cover sections 22 and 23, and flange cover sections 24 and 25. The bobbin 30 has a center cover section 31, groove cover sections 32 and 33, and flange cover sections 34 and 35. The bobbins 20 and 30 are each formed as one body.

The center cover sections 21 and 31 are arranged with respect to the inner core 10 so as to sandwich the center section 11 from the one direction. The groove cover sections 22 and 32 are arranged with respect to the inner core 10 so as to cover the groove sections 14a and 14b from the one direction. The groove cover sections 23 and 33 are arranged with respect to the inner core 10 so as to cover the groove sections 15a and 15b from the one direction. The flange cover sections 24 and 34 are arranged with respect to the inner core 10 so as to sandwich the flange section 12 from the one direction. The flange cover sections 25 and 35 are arranged with respect to the inner core 10 so as to sandwich the flange section 13 from the one direction.

Note that, the flange cover sections 24 and 34 are configured so as to expose one of the ends in the longitudinal direction of the flange section 12 of the inner core 10. The flange cover sections 25 and 35 are configured so as to expose the other end in the longitudinal direction of the flange section 13 of the inner core 10.

Thereby, in a state in which the inner core 10 is covered by the bobbins 20 and 30, the ends in the longitudinal direction of the flange sections 12 and 13 are exposed. Hence, as shown in FIG. 4, the permanent magnets 41 and 42 that are arranged at the ends in the longitudinal direction of the inner core 10 are exposed, and are not covered by the bobbins 20 and 30.

As shown in FIG. 3, opening sections 21a and 31a (bobbin opening sections) are formed in the center cover sections 21 and 31 of the bobbins 20 and 30. The opening sections 21a and 31a are formed so that the shaft 6 that is inserted through the through-hole 11a of the inner core 10 can be inserted through the opening sections 21a and 31a, and are formed so that the spacers 100 and 200 arranged in the recesses 11b and 11c, respectively, of the inner core 10 are exposed (see FIG. 2 and FIG. 10).

Figure 5:
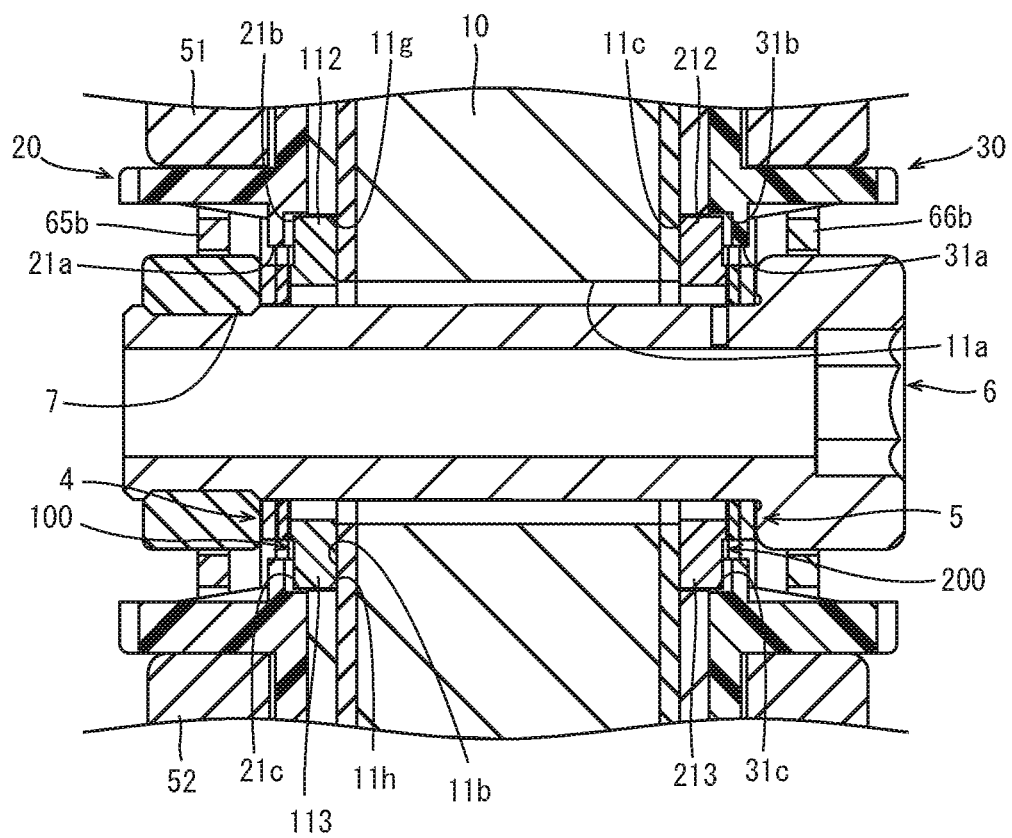
FIG. 5 is an enlarged view of an X-X portion in FIG. 4.

As shown in FIG. 5, on the inner core 10 side of the opening section 21a, a pair of recesses 21b and 21c (housing recesses) in which the protrusion sections 112 and 113, described later, of the spacer 100 are to be positioned, respectively, are formed at facing positions in the longitudinal direction in the opening section 21a. By mounting the bobbin 20 onto the inner core 10 in a state in which the protrusion sections 112 and 113 of the spacer 100 are arranged in the recesses 21b and 21c, the protrusion sections 112 and 113 can each be sandwiched between the bobbin 20 and the inner core 10. Thereby, the spacer 100 can be held between the bobbin 20 and the inner core 10.

Similarly, on the inner core 10 side of the opening section 31a also, a pair of recesses 31b and 31c (housing recesses) in which protrusion sections 212 and 213, described later, of the spacer 200 are to be positioned, respectively, are formed at facing positions in the longitudinal direction in the opening section 31a. By mounting the bobbin 30 onto the inner core 10 in a state in which the protrusion sections 212 and 213 of the spacer 200 are arranged in the recesses 31b and 31c, the protrusion sections 212 and 213 can each be sandwiched between the bobbin 30 and the inner core 10. Thereby, the spacer 200 can be held between the bobbin 30 and the inner core 10.

As shown in FIG. 4, the coils 51 and 52 are wound around the groove cover sections 22 and 32 and the groove cover sections 23 and 33 of the bobbins 20 and 30. That is, the coils 51 and 52 are wound around predetermined positions (formation positions of the groove sections 14a and 14b and the groove sections 15a and 15b of the inner core 10) in the longitudinal direction (orthogonal direction to the one direction) with respect to the inner core 10, respectively.

The spacers 100 and 200 are arranged inside the recesses 11b and 11c which are formed in the opening section of the through-hole 11a of the inner core 10, respectively (FIG. 5). As described later, by arranging the spacers 100 and 200 between the inner core 10 and the plate springs 4 and 5, contact of the plate springs 4 and 5 against the inner core 10 is prevented. The detailed configuration of the spacers 100 and 200 is described later.

As shown FIG. 2 and FIG. 4, the movable element 3 has an outer core 60 composed of a plurality of steel plates having a hole in a central portion that are stacked in the thickness direction, and frames 65 and 66 arranged on both sides in the stacking direction with respect to the outer core 60.

The outer core 60 is formed in a rectangular cylinder shape so as to surround the stator 2 in the longitudinal direction. That is, the outer core 60 is arranged with respect to the stator 2 so that the cylindrical axis direction (stacking direction) of the outer core 60 matches the one direction (stacking direction of the inner core 10) of the stator 2.

At a central portion in the cylindrical axis direction of the outer core 60, magnetic pole sections 61 and 62 are provided at positions corresponding to the permanent magnets 41 and 42 of the stator 2 in a state in which the stator 2 is arranged inside the outer core 60. That is, the outer core 60 is arranged so as to cover the permanent magnets 41 and 42 of the stator 2, and also so that the magnetic pole sections 61 and 62 face the permanent magnets 41 and 42. The magnetic pole sections 61 and 62 protrude inward from the inner face of the outer core 60 so that, in a state in which the stator 2 is arranged inside the outer core 60, a distance from the magnetic pole sections 61 and 62 to the permanent magnets 41 and 42, respectively, becomes short in comparison to a distance from other portions.

The frames 65 and 66 are connected to the two ends in the cylindrical axis direction of the outer core 60 through the plate springs 4 and 5. Specifically, the frame 65 is connected to one side of the outer core 60 in the cylindrical axis direction through the plate spring 4. The frame 66 is connected to the other side of the outer core 60 in the cylindrical axis direction through the plate spring 5.

The frames 65 and 66 are constituted by plate-shaped members, and have an external shape that is a rectangular shape in planar view. As shown in FIG. 2, the frame 65 includes an outer frame section 65a, a center section 65b through which the shaft 6 is inserted, and connection sections 65c and 65d which connect the outer frame section 65a and the center section 65b. The frame 66 includes an outer frame section 66a, a center section 66b through which the shaft 6 is inserted, and connection sections 66c and 66d which connect the outer frame section 66a and the center section 66b.

The outer frame sections 65a and 66a constitute an outer circumferential-side portion of the frames 65 and 66, respectively, and are fixed at four corner portions to the outer circumferential side of the outer core 60 by the bolts 8 through the plate springs 4 and 5. That is, the plate springs 4 and 5 are interposed between the outer frame sections 65a and 66a of the frames 65 and 66 and the outer core 60.

The center sections 65b and 65c are located at a central portion in planar view of the frames 65 and 66, respectively. Through-holes 65e, 66e for inserting the shaft 6 through are provided in the center sections 65b and 65c, respectively.

At a central portion in the longitudinal direction of the frame 65, the connection sections 65c and 65d extend in the short-side direction of the frame 65 from opposing positions of the outer frame section 65a to the center section 65b, respectively. At a central portion in the longitudinal direction of the frame 66, the connection sections 66c and 66d extend in the short-side direction of the frame 66 from opposing positions of the outer frame section 66a to the center section 66b, respectively.

Thereby, holes 65f and 65g that are surrounded by the outer frame section 65a, the center section 65b and the connection sections 65c and 65d are formed in the frame 65. Further, holes 66f and 66g that are surrounded by the outer frame section 66a, the center section 66b and the connection sections 66c and 66d are formed in the frame 66.

In the linear actuator 1, as shown in FIG. 1, a part of the flange cover section 24 of the bobbin 20 and a part of the coil 51 are disposed inside the hole 65f of the frame 65. A part of the flange cover section 25 of the bobbin 20 and a part of the coil 52 are disposed inside the hole 65g of the frame 65. Although not illustrated specifically in the drawings, similarly, a part of the flange cover section 34 of the bobbin 30 and a part of the coil 51 are disposed inside the hole 66f of the frame 66. A part of the flange cover section 35 of the bobbin 30 and a part of the coil 52 are disposed inside the hole 66g of the frame 66.

By means of this configuration, in the linear actuator 1, when the movable element 3 performs a reciprocating movement with respect to the stator 2, the coils 51 and 52 of the movable element 3 can be prevented from interfering with the frames 65 and 66 of the stator 2. Furthermore, the linear actuator 1 can be formed with a compact structure.

As shown in FIG. 4 and FIG. 6, the plate springs 4 and 5 are arranged so that an outer circumferential side thereof is interposed between the outer core 60 and the frames 65 and 66, respectively. The plate springs 4 and 5 are arranged in the stacking direction with respect to the outer core 60 so as to cover the opening sections at both ends in the stacking direction in the outer core 60. Note that, the plate springs 4 and 5 may be constituted by a single plate-shaped member, respectively, or may be constituted by a plurality of plate-shaped members that are superposed in the thickness direction, respectively (in the respective drawings of the present embodiment, a case is illustrated in which the plate springs 4 and 5 are each constituted by two plate-shaped members).

Specifically, as shown in FIG. 2, the plate springs 4 and 5 have outer frame sections 4a and 5a (outer circumferential portions), flexible sections 4b and 5b (connection sections) located on the inner side relative to the outer frame sections 4a and 5a, and fixed sections 4c and 5c (central portions), respectively.

The outer frame sections 4a and 5a are formed in a frame shape on the outer circumferential side of the plate springs 4 and 5 in planar view, respectively. The outer frame sections 4a and 5a and the frames 65 and 66 are fixed to the outer core 60, in a state in which the outer frame sections 4a and 5a are interposed between the outer core 60 and the frames 65 and 66, respectively (see FIG. 4 and FIG. 6).

As shown in FIG. 2, the flexible sections 4b and 5b are located on the inner side of the outer frame sections 4a and 5a in planar view, and are formed so as to follow along the outer frame sections 4a and 5a, respectively. Specifically, the flexible sections 4b and 5b connect the fixed sections 4c and 5c located at the central portion of the plate springs 4 and 5 in planar view and the respective ends in the longitudinal direction of the outer frame sections 4a and 5a, respectively, and are formed in a "figure of 8" shape so as to follow along the inner side of the outer frame sections 4a and 5a, respectively. In this configuration, by the flexible sections 4b and 5b deforming in the thickness direction, the outer frame sections 4a and 5a can undergo a relative displacement with respect to the fixed sections 4c and 5c.

Figure 7:
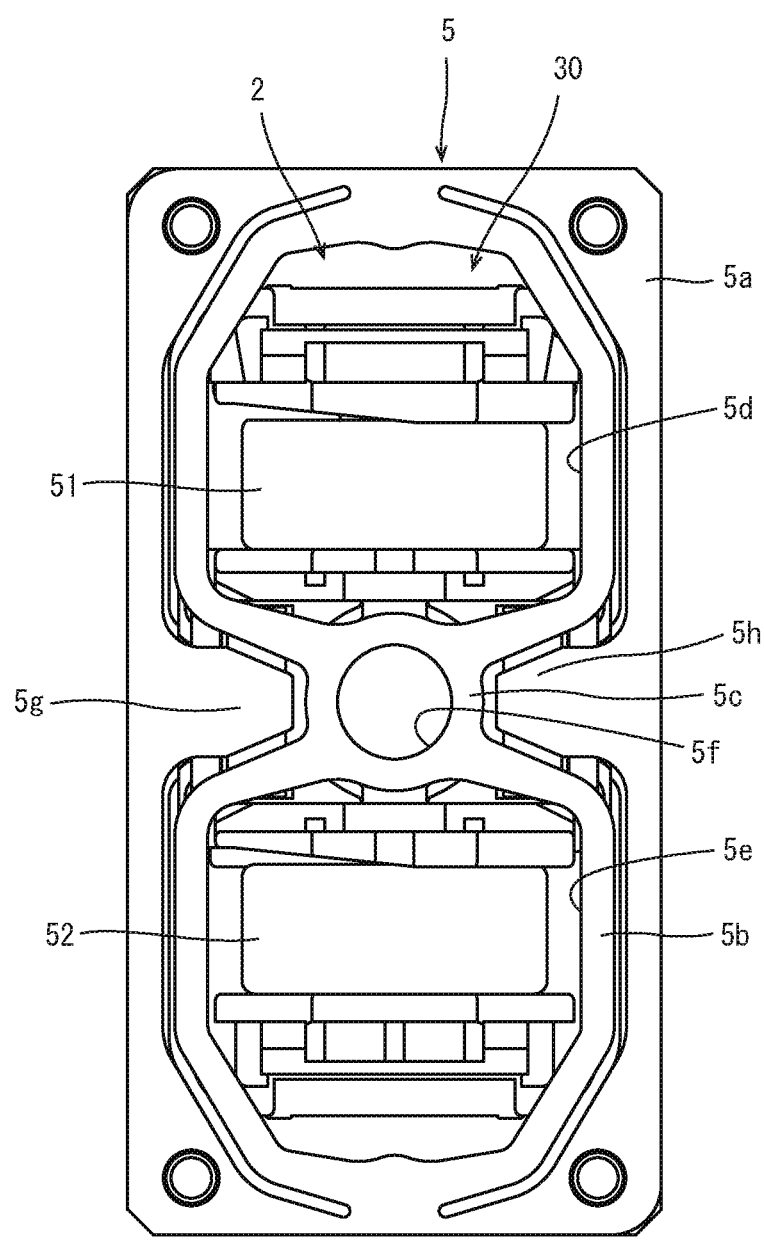
FIG. 7 is a view illustrating a positional relationship between a plate spring and the stator.

According to the configuration of the flexible sections 4b and 5b described above, on the inner side of the flexible sections 4b and 5b, holes 4d, 4e, 5d and 5e are formed in correspondence with the holes 65f, 65g, 66f and 66g of the frames 65 and 66 of the movable element 3. By having these holes 4d, 4e, 5d and 5e formed on the inner side of the flexible sections 4b and 5b, interference between the plate springs 4 and 5 and the bobbins 20 and 30 and the coils 51 and 52 of the stator 2 can be prevented. An example of the positional relationship between the plate spring 5 and the stator 2 is shown in FIG. 7.

As shown in FIG. 2, through-holes 4f and 5f through which the shaft 6 is inserted are formed in the fixed sections 4c and 5c, respectively. As described later, by a threaded section of the shaft 6 being fastened to the nut 7, the fixed sections 4c and 5c are sandwiched between the spacer 100 of the stator 2 and the center sections 65b and 66b of the frames 65 and 66, respectively. Thereby, the fixed sections 4c and 5c are fixed to the stator 2.

Note that portions of the outer frame sections 4a and 5a extend towards the fixed sections 4c and 5c from opposing positions on the inner side at the central portion in the longitudinal direction, respectively. The extended portions are extension sections 4g, 4h, 5g and 5h.

The shaft 6 has a shank section 6a extending in an axial direction, and a head section 6b provided at an end on one side of the shank section 6a. A threaded section 6c is provided on the other side of the shank section 6a. The shaft 6 is constructed so that the threaded section 6c protrudes from the frame 65 in a state in which the shank section 6a passes through the frame 66, the plate spring 5, the spacer 200, the inner core 10, the spacer 100, the plate spring 4 and the frame 65 in that order as shown in FIG. 4. The frame 66, the plate spring 5, the spacer 200, the inner core 10, the spacer 100, the plate spring 4 and the frame 65 are integrated together by fastening the nut 7 to the threaded section 6c of the shaft 6.

(Spacers)

Next, the configuration of the spacers 100 and 200 of the stator 2 will be described in detail using FIG. 4 and FIG. 8 to FIG. 11.

The spacers 100 and 200 are arranged between the inner core 10 of the stator 2 and the plate springs 4 and 5, respectively (see FIG. 4). Note that, since the spacers 100 and 200 have the same configuration as each other, hereunder only the spacer 100 will be described and a description of the spacer 200 will be omitted.

Figure 8:
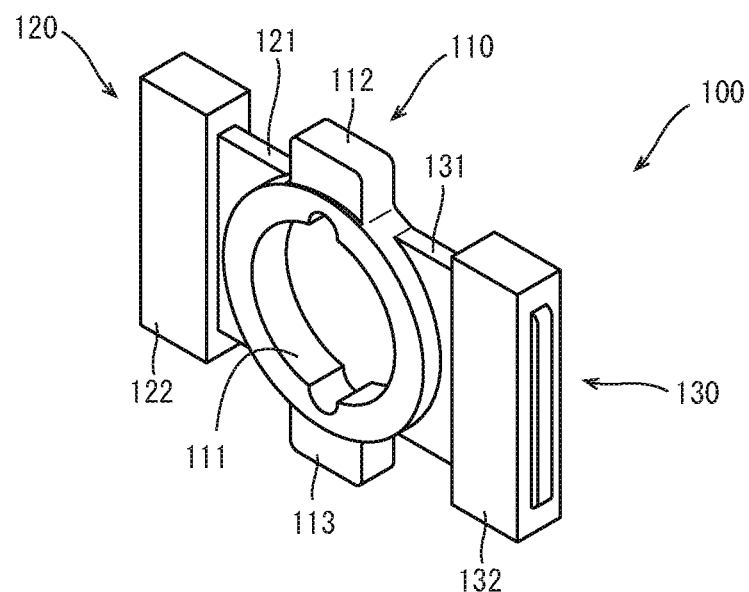
FIG. 8 is a perspective view illustrating the overall configuration of a spacer.

As shown in FIG. 8, the spacer 100 has the penetration section 110 which is an annular shape having an insertion hole 111 that the shaft 6 is inserted through, and the restriction sections 120 and 130 which extend outward in the radial direction from opposing positions in the radial direction of the penetration section 110. That is, the restriction sections 120 and 130 are provided so as to sandwich the penetration section 110 in the radial direction.

The thickness of the penetration section 110 is greater than the depth (dimension in one direction, that is, the stacking direction of the inner core 10) of the first recess 11d that is provided in the inner core 10 (see FIG. 4). Therefore, in a state in which the penetration section 110 is disposed in the first recess 11d, a part of the penetration section 110 in the thickness direction (the aforementioned one direction, that is, the stacking direction of the inner core 10) protrudes in the thickness direction relative to the inner core 10.

Thereby, in a state in which the spacer 100 is arranged between the plate spring 4 and the inner core 10, the penetration section 110 contacts the fixed section 4c of the plate spring 4. In this state, as described above, by fastening together the shaft 6 and the nut 7, the fixed section 4c of the plate spring 4 is integrated with the inner core 10 through the penetration section 110.

By adopting a configuration in which the thickness of the penetration section 110 is as described above, the flexible section 4b of the plate spring 4 separates from the inner core 10. That is, the penetration section 110 functions as a spacer that forms a gap between the inner core 10 and the flexible section 4b of the plate spring 4.

As shown in FIG. 8, in the penetration section 110, the protrusion sections 112 and 113 are provided that, when the spacer 100 is viewed from the thickness direction, extend outward in the radial direction from opposing positions in the orthogonal direction to the extending direction of the restriction sections 120 and 130. As shown in FIG. 5, in a state in which the spacer 100 is arranged in the recess 11b of the inner core 10, the protrusion sections 112 and 113 are disposed in third recesses 11g and 11h. Further, in a state in which the bobbin 20 is mounted onto the inner core 10, the protrusion sections 112 and 113 are disposed in recesses 21b and 21c of the bobbin 20. Thereby, the protrusion sections 112 and 113 can be held between the inner core 10 and the bobbin 20.

As shown in FIG. 8, the restriction sections 120 and 130 include plate-shaped base sections 121 and 131 (base sections) extending outward in the radial direction from the penetration section 110, and elastic contact sections 122 and 132 formed on the end side in the extending direction of the base sections 121 and 131, respectively.

The base sections 121 and 131 are formed integrally with the penetration section 110 from a metallic material or the like. Specifically, the base sections 121 and 131 are integrally provided on the outer circumferential side of the penetration section 110 so that the thickness direction matches the one direction in which the insertion hole 111 of the penetration section 110 extends. Note that, the base sections 121 and 131 may be a shape other than a plate shape as long as the elastic contact sections 122 and 132 can be formed on the surface thereof and the base sections 121 and 131 have a configuration which has rigidity of a degree such that the base sections 121 and 131 do not deform when a displacement of a predetermined amount or more of the plate spring 4 is restricted by the restriction sections 120 and 130.

The elastic contact sections 122 and 132 are composed of, for example, rubber or a resin material, and are formed so as to surround the end side in the extending direction of the base sections 121 and 131, respectively, as viewed from the extending direction. The elastic contact sections 122 and 132 elastically contact the plate spring 4 when the plate spring 4 deforms and contacts the restriction sections 120 and 130. Thereby, the occurrence of abnormal noise or the like can be prevented when the plate spring 4 contacts the restriction sections 120 and 130.

Note that the elastic contact sections 122 and 132 are not formed at the ends in the extending direction of the base sections 121 and 131. Therefore, the ends in the extending direction of the base sections 121 and 131 are exposed from the elastic contact sections 122 and 132. Thereby, in a case where the spacer 100 is grasped by a robot or the like for assembling the linear actuator 1, both ends in the extending direction of the base sections 121 and 131 that are exposed from the elastic contact sections 122 and 132 can be grasped. Hence, the spacer 100 can be accurately grasped by a robot or the like.

Figure 9:
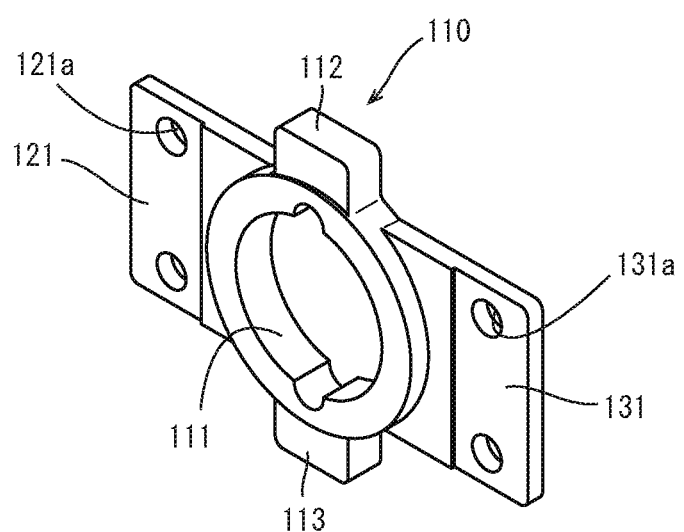
FIG. 9 is a perspective view illustrating a state in which an elastic contact section is not provided in the spacer.

Further, as shown in FIG. 9, through-holes 121a and 131a are formed in the base sections 121 and 131, respectively, at portions on the end sides in the extending direction that are portions at which the elastic contact sections 122 and 132 are formed. Thereby, when forming the elastic contact sections 122 and 132 on the end sides in the extending direction of the base sections 121 and 131, rubber or a resin material or the like used to constitute the elastic contact sections 122 and 132 enters the through-holes 121a and 131a. Hence, in each of the elastic contact sections 122 and 132, a portion provided on one side (the plate spring 4 side) in the thickness direction of the base sections 121 and 131 and a portion provided on the other side (the inner core 10 side) are connected by portions located within the through-holes 121a and 131a. Therefore, the elastic contact sections 122 and 132 can be more securely attached to the base sections 121 and 131.

Furthermore, by forming the elastic contact sections 122 and 132 as described above, it is not necessary to adhesively fix the elastic contact sections 122 and 132 to the base sections 121 and 131. Thus, the elastic contact sections 122 and 132 can be easily provided on the base sections 121 and 131, and peeling off of the elastic contact sections 122 and 132 from the base sections 121 and 131 can be prevented.

Note that, although in the present embodiment a configuration is adopted in which the base sections 121 and 131 and the elastic contact sections 122 and 132 are integrated by providing the through-holes 121a and 131a in the base sections 121 and 131 and forming the elastic contact sections 122 and 132 on both sides in the thickness direction of the base sections 121 and 131, the present invention is not limited thereto, and the elastic contact sections may be adhesively fixed to the respective base sections.

Figure 10:
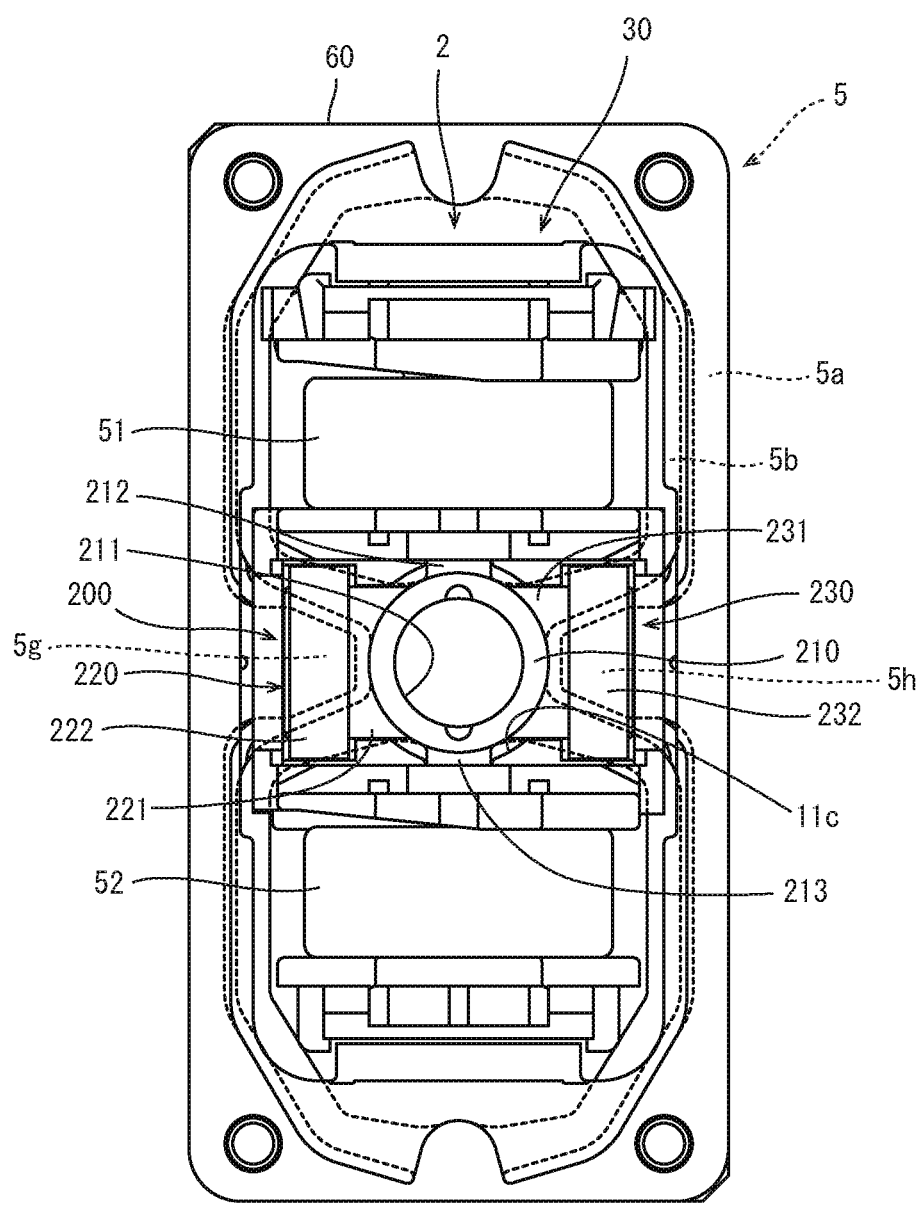
FIG. 10 is a view illustrating the positional relationship between the spacer and the plate spring.

Next, the positional relationship between the spacers 100 and 200 and the plate springs 4 and 5 in a state in which the spacers 100 and 200 having the above described configuration are mounted on the inner core 10 will be described. In FIG. 10, for example, the positional relationship between the spacer 200 and the plate spring 5 in a state in which the spacer 200 is mounted on the inner core 10 is shown. FIG. 10 is a view of the linear actuator 1, as seen from the plate spring 5, showing a state in which the frame 66 and the plate spring 5 have been detached. In this connection, because the positional relationship between the spacer 100 and the plate spring 4 in a state in which the spacer 100 is mounted on the inner core 10 is the same as the positional relationship between the spacer 200 and the plate spring 5, a description thereof is omitted herein.

In FIG. 10, reference numeral 210 denotes a penetration section, reference numeral 211 denotes an insertion hole, reference numerals 212 and 213 denote protrusion sections, reference numerals 220 and 230 denote restriction sections, reference numerals 221 and 231 denote base sections, and reference numerals 222 and 232 denote elastic contact sections. Further, to facilitate the description, the plate spring 5 is shown by broken lines in FIG. 10.

As shown in FIG. 10, as viewed from the aforementioned one direction, the restriction sections 220 and 230 of the spacer 200 are positioned straddling the fixed section 5c side (central portion side) in the flexible section 5b (connection section) of the plate spring 5 and, among the sections of the outer frame section 5a of the plate spring 5, the extension sections 5g and 5h which extend toward the fixed section 5c from opposing positions on the inner side at the central portion in the longitudinal direction. Thereby, in a case where the outer frame section 5a of the plate spring 5 deforms by a large amount with respect to the fixed section 5c, a displacement of a predetermined amount or more is restricted by contact of the extension sections 5g and 5h of the outer frame section 5a against the restriction sections 220 and 230.

Figure 11:
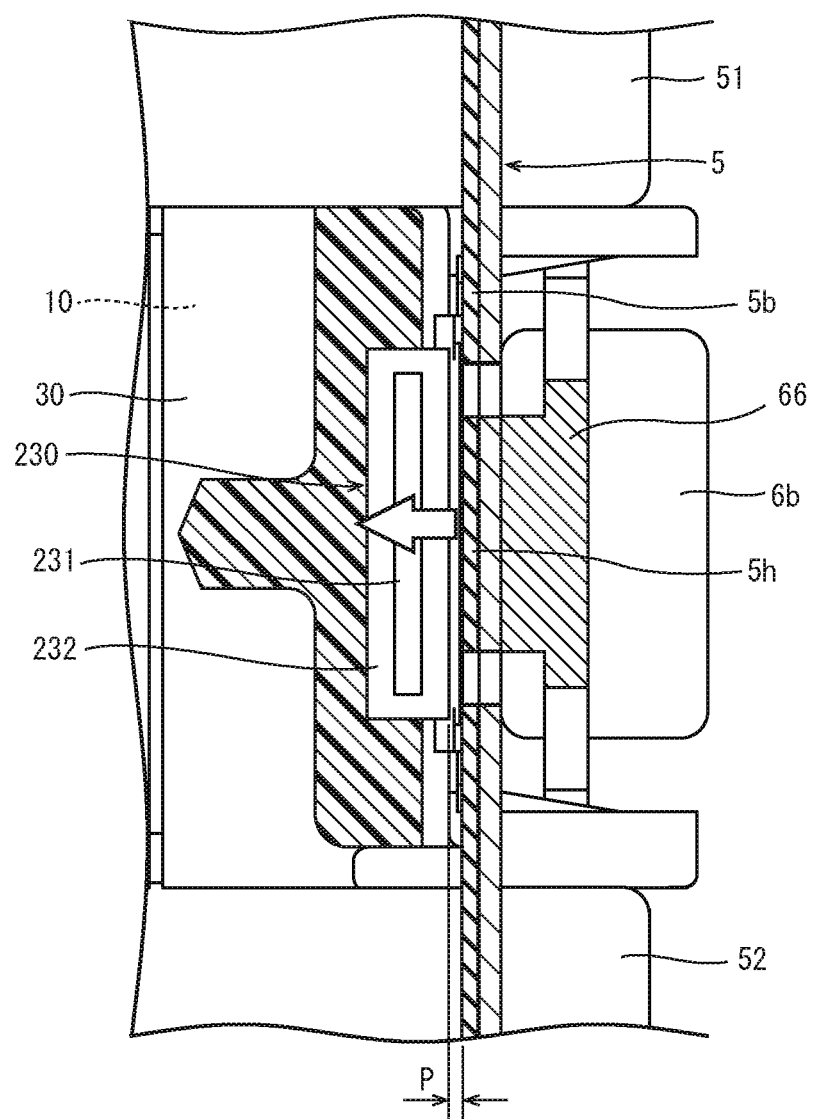
FIG. 11 is a partially enlarged cross-sectional view illustrating, in an enlarged manner, a gap between a restriction section of the spacer and the plate spring.

In FIG. 11, the positional relationship between the spacer 200 and the plate spring 5 in one direction (stacking direction of the inner core 10) of the stator 2 is illustrated in an enlarged manner. As shown in FIG. 11, a gap P in the aforementioned one direction is formed between the restriction section 230 of the spacer 200 and the plate spring 5. Thereby, as long as deformation of the plate spring 5 to the inner core 10 side that is indicated by an outline arrow in the drawing is within the range of the gap P (predetermined amount), the deformation of the plate spring 5 is not restricted by the restriction section 230.

On the other hand, in a case where a deformation that is greater than the gap P occurs at the plate spring 5 (displacement of a predetermined amount or more), the extension sections 5g and 5h of the outer frame section 5a of the plate spring 5 contact against the restriction section 230, and further deformation is restricted. Hence, when the plate spring 5 deforms toward the inner core 10 side, contact of the plate spring 5 against a peripheral portion of the through-hole 11a of the inner core 10 can be more securely prevented.

As described above, by providing the restriction sections 120, 130, 220 and 230 on the spacers 100 and 200, the occurrence of a situation in which the plate springs 4 and 5 deform by a large amount and contact the inner core 10 can be prevented.

Further, the restriction sections 120, 130, 220 and 230 are provided so as to sandwich the penetration sections 110 and 210 of the spacers 100 and 200 in the radial direction. Thereby, displacement of the plate springs 4 and 5 by a predetermined amount or more to the inner core 10 side in the areas around the penetration sections 110 and 210 can be more securely restricted.

Furthermore, according to the above described configuration, the spacers 100 and 200 that are each a single member function as spacers which form a gap between the inner core 10 and the flexible sections 4b and 5b of the plate springs 4 and 5, and also function as restriction members that restrict deformation of a predetermined amount or more of the plate springs 4 and 5. Therefore, displacement of the plate springs 4 and 5 of a degree such that the plate springs 4 and 5 contact the inner core 10 can be restricted while suppressing an increase in the number of components.

Hereunder, among the components of the linear actuator 1, an outline of a method for assembling the stator 2 will be described using FIG. 12.

Figure 12:
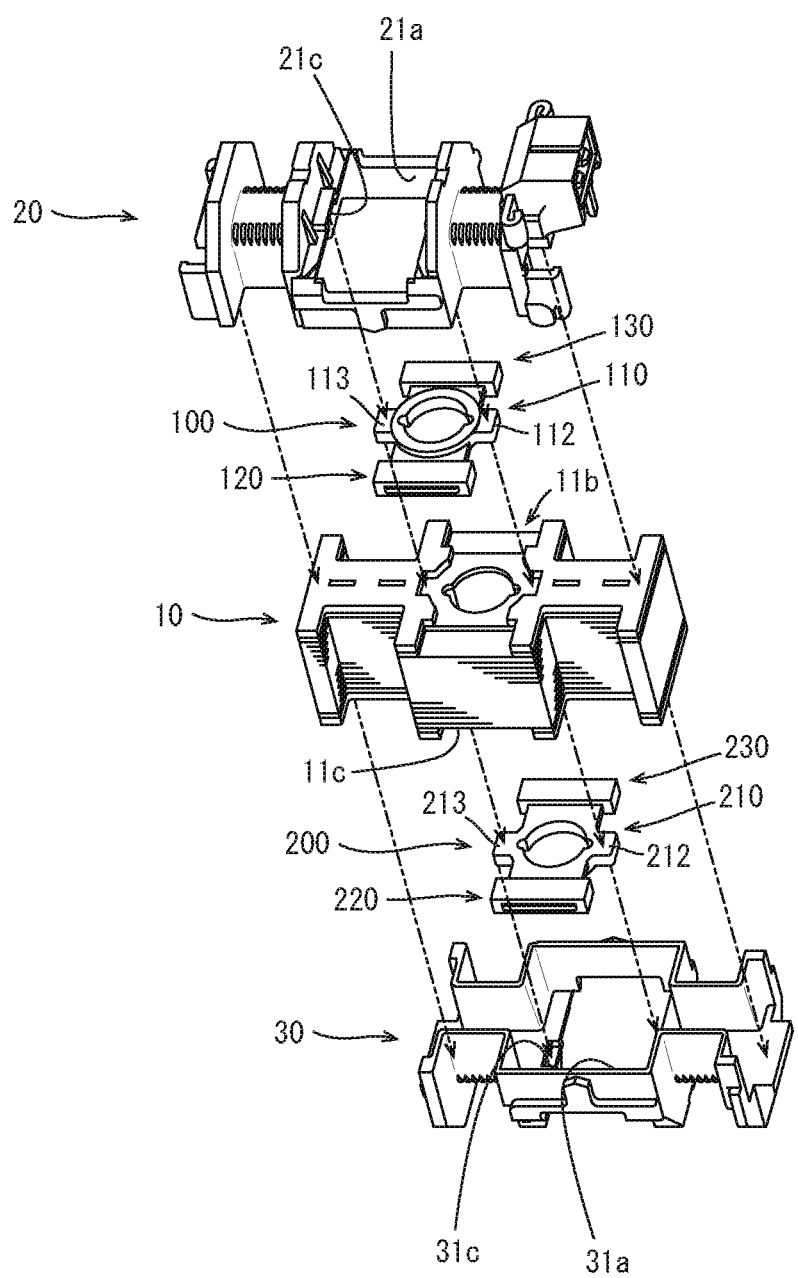
FIG. 12 is a view illustrating a method for assembling the stator.

As shown in FIG. 12, in a state in which the bobbin 30 is disposed so that the longitudinal direction thereof is the cross direction, the spacer 200 is mounted to the bobbin 30 so that the protrusion sections 212 and 213 are positioned inside the recesses 31b and 31c of the bobbin 30, respectively. At such time, with respect to the spacer 200, the protrusion sections 212 and 213 are supported by the recesses 31b and 31c of the bobbin 30, respectively, and the restriction sections 220 and 230 of the penetration section 210 are positioned inside the opening section 31a of the bobbin 30.

Next, the inner core 10 is mounted to the bobbin 30 so that the longitudinal direction thereof is the cross direction. At such time, the spacer 200 is positioned inside the recess 11c formed in the inner core 10. Subsequently, the spacer 100 is disposed inside the recess 11b of the inner core 10, and the bobbin 20 is covered thereon from the upper side. Thus, assembly of the stator 2 is completed.

The above described assembly of the stator 2 is performed, for example, by a robot. In the aforementioned assembly method, because the respective components are stacked on top of each other in one direction, it is not necessary to change the posture or the like of the components during the course of performing the work. Hence, this method is suitable for assembly work performed by a robot. Note that, the above described assembly of the stator 2 may also be performed manually by a worker.

As described above, in the spacers 100 and 200, because the penetration sections 110 and 210 are formed integrally with the restriction sections 120, 130, 220 and 230, a mechanism that restricts displacement of a predetermined amount or more of the plate springs 4 and 5 to the inner core 10 side can be realized without increasing the number of components. Thereby, a mechanism that restricts displacement of the plate springs 4 and 5 can be added to the linear actuator 1 without causing a deterioration in the assembly workability with respect to the stator 2 of the linear actuator 1.

Further, since the recess 31b is provided in the bobbin 30, and positioning of the spacer 200 with respect to the bobbin 30 can be performed by disposing the protrusion sections 212 and 213 of the spacer 200 inside the recess 31b, assembly work can be easily and efficiently performed by a robot or the like.

Furthermore, by providing the recesses 11b and 11c at two ends in one direction (stacking direction) of the inner core 10 in order to dispose the spacers 100 and 200 in the recesses 11b and 11c, respectively, the stator 2 can be made a compact structure in the one direction. Thereby, the linear actuator 1 that is compact in the one direction is obtained.

In addition, the plurality of restriction sections 120, 130, 220 and 230 are provided so as to sandwich the penetration sections 110 and 210 as viewed from the aforementioned one direction. Thereby, a displacement of the plate springs 4 and 5 to the inner core 10 side that is a displacement of a predetermined amount or more can be more securely restricted by the plurality of restriction sections 120, 130, 220 and 230 provided around the penetration sections 110 and 210.

Further, the restriction sections 120, 130, 220 and 230 have the base sections 121, 131, 221 and 231 that are formed integrally with the penetration sections 110 and 210, and the elastic contact sections 122, 132, 222 and 232 that are provided at least on the corresponding plate spring 4 or 5 side of the base sections 121, 131, 221 and 231. Thereby, the base sections 121, 131, 221 and 231 of the restriction sections 120, 130, 220 and 230 and the penetration sections 110 and 210 can be integrally formed, and therefore a mechanism that suppresses deformation of the plate springs 4 and 5 can be added to the linear actuator 1 without increasing the number of components.

In addition, the elastic contact sections 122, 132, 222 and 232 are also provided on the inner core 10 side of the base sections 121, 131, 221 and 231, and portions provided on the inner core 10 side and portions provided on the corresponding plate spring 4 or 5 side of the base sections 121, 131, 221 and 231 are connected. Thereby, the elastic contact sections 122, 132, 222 and 232 are more securely attached to the base sections 121, 131, 221 and 231 of the spacers 100 and 200. Hence, it is more difficult for the elastic contact sections 122, 132, 222 and 232 to become detached from the base sections 121, 131, 221 and 231. Therefore, the function of the restriction sections 120, 130, 220 and 230 of the spacers 100 and 200 can be more surely obtained.

Other Embodiments

Although an embodiment of the present invention has been described above, the foregoing embodiment merely represents one example for implementing the present invention. Accordingly, the present invention is not limited to the above embodiment, and the above embodiment can be appropriately modified within a range that does not deviate from the gist of the present invention.

In the above described embodiment, the spacers 100 and 200 having the restriction sections 120, 130, 220 and 230 are arranged on both sides in one direction (stacking direction) of the inner core 10. However, a configuration may also be adopted in which a spacer having restriction sections is arranged only on one side in the one direction of the inner core 10.

In the above described embodiment, the recesses 11*b* and 11*c* for disposing the spacers 100 and 200 therein are provided at two ends in the aforementioned one direction in the center section 11 of the inner core 10. However, a configuration may also be adopted in which a recess for disposing a spacer therein is provided only at one end in the one direction in the center section 11 of the inner core 10, or a configuration may be adopted in which the recesses are not provided.

In the above described embodiment, the spacers 100 and 200 have the pair of restriction sections 120 and 130 and the pair of restriction sections 220 and 230, respectively, that extend outward in the radial direction from the penetration sections 110 and 210 so as to sandwich the penetration sections 110 and 210 in the radial direction. However, the respective spacers 100 and 200 may have one restriction section or may have three or more restriction sections. Further, the arrangement of the restriction sections 120, 130, 220 and 230 is not limited to the configuration of the present embodiment, and any arrangement may be adopted as long as restriction sections are provided integrally with respect to the penetration sections 110 and 210.

In the above described embodiment, the restriction sections 120, 130, 220 and 230 of the spacers 100 and 200 have the elastic contact sections 122, 132, 222 and 232 that are provided on both sides in the thickness direction of the base sections 121, 131, 221 and 231. However, a configuration may also be adopted in which the elastic contact sections are provided only on the face on the inner core 10 side of the base sections 121, 131, 221 and 231.

In the above described embodiment, the pair of protrusion sections 112 and 113 that extend outward in the radial direction are provided in the penetration sections 110 and 210 of the spacers 100 and 200. However, a configuration may be adopted in which one protrusion section or three or more protrusion sections are provided in the penetration sections 110 and 210. Further, the protrusion sections 112 and 113 are also not limited to the configuration of the present embodiment, and any arrangement may be adopted as long as the protrusion sections extend outward in the radial direction from the penetration sections 110 and 210.

INDUSTRIAL APPLICABILITY

The present invention can be utilized in a linear actuator equipped with a stator, a movable element, and a plate spring that connects the movable element and the stator in a manner such that the movable element is capable of performing a reciprocating movement with respect to the stator.

The invention claimed is:

1. A linear actuator, comprising:
a stator,
a movable element, and
a plate spring that connects the movable element and the stator in a manner such that the movable element is capable of performing a reciprocating movement with respect to the stator;
wherein:
the stator includes:
an inner core having a through-hole extending in one direction,
a permanent magnet arranged at least at one end among two ends in an orthogonal direction to the one direction in the inner core,
a coil that is wound around the inner core at a predetermined position in the orthogonal direction,
a shaft that is inserted through the through-hole of the inner core, and
a spacer that is arranged in an opening section of the through-hole in the inner core, and through which the shaft passes;
the movable element has an outer core arranged outside of the stator so as to cover the permanent magnet;
an outer circumferential portion of the plate spring is connected to the outer core, and a central portion of the plate spring is connected to the inner core through the spacer in a state in which the shaft passes therethrough; and
the spacer has:
a penetration section having an insertion hole that the shaft is inserted through, and
a restriction section that restricts a displacement of a predetermined amount or more of the plate spring to the inner core side, wherein:
the restriction section includes a plate-shaped base section extending outward in a radial direction from the penetration section, and an elastic contact section formed on an end side in an extending direction of the base section, and
the elastic contact section is formed so as to surround the end side in the extending direction of the base section, as viewed from the extending direction of the base section.

2. The linear actuator according to claim 1, wherein:
a recess capable of housing the spacer is formed in the opening section in the inner core.

3. The linear actuator according to claim 2, further comprising:
a bobbin that covers the inner core, and around which the coil is wound;
wherein:
a bobbin opening section which the shaft is inserted through and which exposes the spacer is formed in the bobbin;
in the penetration section of the spacer, a protrusion section is provided that, when viewed from the one direction, extends outward at a different position from the restriction section; and
on the inner core side of the bobbin opening section, a housing recess that is capable of housing the protrusion section of the spacer is formed.

4. The linear actuator according to claim 2, wherein:
the plate spring has a connection section that connects the central portion to one part of the outer circumferential portion in a manner that enables a relative displacement in a thickness direction between the outer circumferential portion and the central portion; and the restriction section restricts a displacement of the predetermined amount or more of the outer circumferential portion.

5. The linear actuator according to claim 1, further comprising:

a bobbin that covers the inner core, and around which the coil is wound;

wherein:

a bobbin opening section which the shaft is inserted through and which exposes the spacer is formed in the bobbin;

in the penetration section of the spacer, a protrusion section is provided that, when viewed from the one direction, extends outward at a different position from the restriction section; and on the inner core side of the bobbin opening section, a housing recess that is capable of housing the protrusion section of the spacer is formed.

6. The linear actuator according to claim 5, wherein:

the plate spring has a connection section that connects the central portion to one part of the outer circumferential portion in a manner that enables a relative displacement in a thickness direction between the outer circumferential portion and the central portion; and the restriction section restricts a displacement of the predetermined amount or more of the outer circumferential portion.

7. The linear actuator according to claim 1, wherein:

the plate spring has a connection section that connects the central portion to one part of the outer circumferential portion in a manner that enables a relative displacement in a thickness direction between the outer circumferential portion and the central portion; and the restriction section restricts a displacement of the predetermined amount or more of the outer circumferential portion.

8. A linear actuator, comprising:

a stator, a movable element, and a plate spring that connects the movable element and the stator in a manner such that the movable element is capable of performing a reciprocating movement with respect to the stator;

wherein:

the stator includes:

an inner core having a through-hole extending in one direction, a permanent magnet arranged at least at one end among two ends in an orthogonal direction to the one direction in the inner core, a coil that is wound around the inner core at a predetermined position in the orthogonal direction, a shaft that is inserted through the through-hole of the inner core, and a spacer that is arranged in an opening section of the through-hole in the inner core, and through which the shaft passes;

the movable element has an outer core arranged outside of the stator so as to cover the permanent magnet;

an outer circumferential portion of the plate spring is connected to the outer core, and a central portion of the plate spring is connected to the inner core through the spacer in a state in which the shaft passes therethrough; and the spacer has:

a penetration section having an insertion hole that the shaft is inserted through, and a restriction section that restricts a displacement of a predetermined amount or more of the plate spring to the inner core side, the linear actuator further comprising:

a bobbin that covers the inner core, and around which the coil is wound;

wherein:

a bobbin opening section which the shaft is inserted through and which exposes the spacer is formed in the bobbin;

in the penetration section of the spacer, a protrusion section is provided that, when viewed from the one direction, extends outward at a different position from the restriction section; and on the inner core side of the bobbin opening section, a housing recess that is capable of housing the protrusion section of the spacer is formed, wherein:

a pair of the protrusion sections are provided in a manner such that, when the penetration section is viewed from the one direction, the pair of the protrusion sections sandwich the penetration section, and a pair of the housing recesses are provided at opposing positions on the inner core side in the bobbin opening section when the inner core side of the bobbin opening section is viewed from the one direction, so as to be capable of housing the pair of protrusion sections.

9. The linear actuator according to claim 8, wherein:

the plate spring has a connection section that connects the central portion to one part of the outer circumferential portion in a manner that enables a relative displacement in a thickness direction between the outer circumferential portion and the central portion; and the restriction section restricts a displacement of the predetermined amount or more of the outer circumferential portion.

10. A linear actuator, comprising:

a stator, a movable element, and a plate spring that connects the movable element and the stator in a manner such that the movable element is capable of performing a reciprocating movement with respect to the stator;

wherein:

the stator includes:

an inner core having a through-hole extending in one direction, a permanent magnet arranged at least at one end among two ends in an orthogonal direction to the one direction in the inner core, a coil that is wound around the inner core at a predetermined position in the orthogonal direction, a shaft that is inserted through the through-hole of the inner core, and a spacer that is arranged in an opening section of the through-hole in the inner core, and through which the shaft passes;

the movable element has an outer core arranged outside of the stator so as to cover the permanent magnet;

an outer circumferential portion of the plate spring is connected to the outer core, and a central portion of the plate spring is connected to the inner core through the spacer in a state in which the shaft passes therethrough; and the spacer has:
a penetration section having an insertion hole that the shaft is inserted through, and
a restriction section that restricts a displacement of a predetermined amount or more of the plate spring to the inner core side,
wherein a recess capable of housing the spacer is formed in the opening section in the inner core,
the linear actuator further comprising:
a bobbin that covers the inner core, and around which the coil is wound;
wherein:
a bobbin opening section which the shaft is inserted through and which exposes the spacer is formed in the bobbin;
in the penetration section of the spacer, a protrusion section is provided that, when viewed from the one direction, extends outward at a different position from the restriction section; and
on the inner core side of the bobbin opening section, a housing recess that is capable of housing the protrusion section of the spacer is formed,
wherein:
a pair of the protrusion sections are provided in a manner such that, when the penetration section is viewed from the one direction, the pair of the protrusion sections sandwich the penetration section, and
a pair of the housing recesses are provided at opposing positions on the inner core side in the bobbin opening section when the inner core side of the bobbin opening section is viewed from the one direction, so as to be capable of housing the pair of protrusion sections.

* * * * *